W. C. ALLISON.
Coupling for Tubes.

No. 232,432.  Patented Sept. 21, 1880.

Attests  
[signature]  
L. J. Matos.

Inventor  
William C. Allison  
By his atty.  
[signature]

United States Patent Office.

WILLIAM C. ALLISON, OF PHILADELPHIA, PENNSYLVANIA.

COUPLING FOR TUBES.

SPECIFICATION forming part of Letters Patent No. 232,432, dated September 21, 1880.

Application filed February 19, 1880.

*To all whom it may concern:*

Be it known that I, WILLIAM CLARE ALLISON, of the city and county of Philadelphia, and State of Pennsylvania, have invented an Improvement in Couplings for Tubes, of which the following is a specification.

My invention relates to that class of couplings in which the tubes or rods to be jointed are coupled by means of a socket; and it consists in upsetting the ends of the tube or rod and cutting thereon a male vanishing screw-thread, in greatest depth about equal to the thickness of such upsetting.

It consists, further, in providing said tubes with a coupler or socket containing within the same a female vanishing screw-thread, and which female thread fits over the male threads upon the ends of the tubes.

In a patent granted to me July 12, 1870, I describe vanishing male screw-threads upon the ends of ordinary pipes or rods, the ends of which pipes are coupled by a socket or sleeve having corresponding vanishing female screw-threads, and in the patent granted to me April 29, 1879, I describe a metal pipe having one of its ends upset and expanded and the other end upset, adapting it to be joined to another pipe by a vanishing screw-thread; but in neither case do I set forth a tube having its ends upset and having a vanishing male screw-thread cut thereon and adapted to be joined to another and similar tube by a coupler or socket provided with corresponding vanishing female screw-threads.

The object of my invention is to effect the perfect and secure junction of tubes, &c., as set forth in the former of the above patents, and in addition to prevent the slightest weakening of the joint by upsetting the tube.

This construction of tubing especially adapts it to use in oil-wells, where strength as well as an oil-tight joint is required.

By using vanishing screw-threads the ends of the pipes may be screwed into the socket until it becomes tightly jammed therein, forming the most perfect liquid-tight joint.

Figure 1:
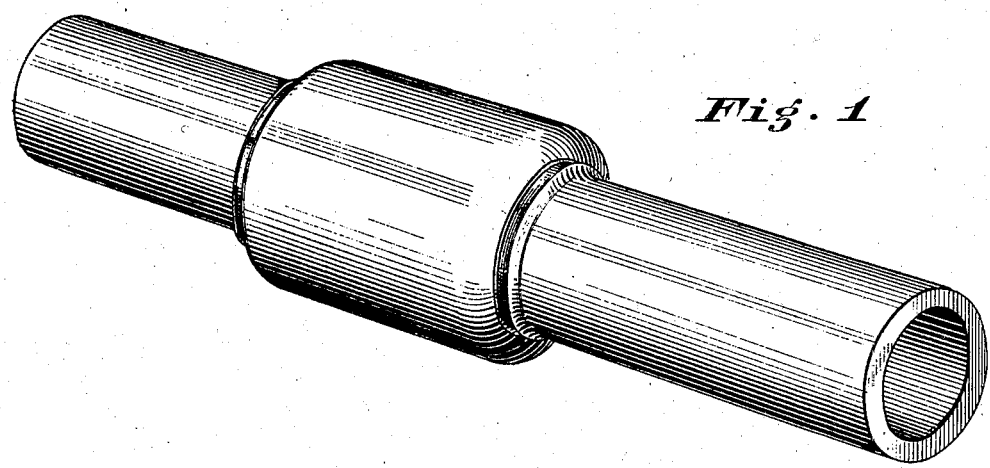
Figure 2:
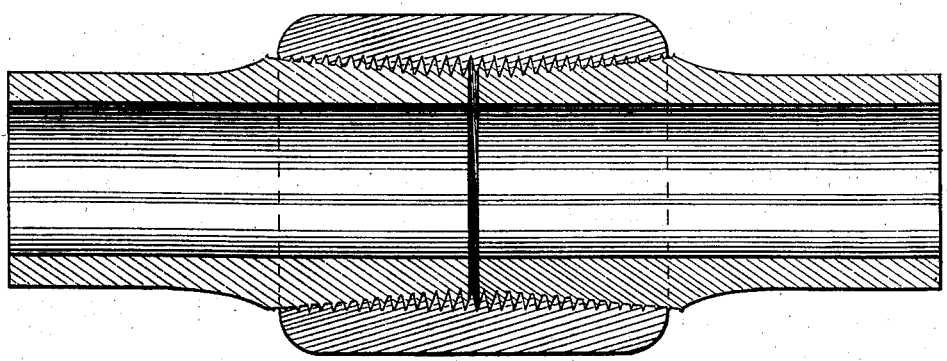

In the drawings, Figure 1 is a perspective view of my improved coupling. Fig. 2 is a longitudinal section of same.

A A are the ends of two tubes or sections of tubing, and are joined by a coupler or socket, B. The ends of the tube A are upset or thickened, as at C, and upon the upsetting are cut vanishing male screw-threads D, making the thread in greatest depth preferably equal to the thickness of the upsetting, thereby allowing the tube to be as thick at the deepest-threaded part as at any other, and more so toward the vanishing end of the thread. The coupler or socket B is provided with a corresponding female vanishing and tapering screw-thread, E.

By screwing the ends of the tubes into the coupler or socket the tapers formed on the ends of the tubes by the vanishing screw-threads fit or jam tightly with the tapering threaded hole in the socket, thereby making a very tight and liquid-tight joint without the use of red lead or other analogous substance.

If desired, part of the screw-thread may be full and part only vanishing.

The joint is also adapted to couple rods, &c.

Having now described my invention, what I claim as new, and desire to secure by Letters Patent, is—

A metallic tube upset and provided with a vanishing screw-thread on one or both of its ends, and adapted to be coupled to another tube, in combination with a coupler or socket internally screw-threaded, substantially as described, and for the purpose specified.

In testimony of which invention I hereunto set my hand.

W. C. ALLISON.

Witnesses:
R. S. REED,
C. D. HARLAND.